United States Patent

(12) United States Patent
Long

(10) Patent No.: US 11,218,521 B2
(45) Date of Patent: Jan. 4, 2022

(54) VIDEO CONFERENCE IMPLEMENTATION METHOD, SERVER AND COMPUTER READABLE STORAGE MEDIUM

(71) Applicant: ZTE CORPORATION, Guangdong (CN)

(72) Inventor: Hui Long, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/615,813

(22) PCT Filed: May 9, 2018

(86) PCT No.: PCT/CN2018/086212
§ 371 (c)(1),
(2) Date: Nov. 21, 2019

(87) PCT Pub. No.: WO2018/214735
PCT Pub. Date: Nov. 29, 2018

(65) Prior Publication Data
US 2020/0137129 A1 Apr. 30, 2020

(30) Foreign Application Priority Data
May 23, 2017 (CN) .......................... 201710367908.X

(51) Int. Cl.
*H04L 29/06* (2006.01)
*H04M 3/56* (2006.01)
*H04N 7/15* (2006.01)

(52) U.S. Cl.
CPC ........ *H04L 65/403* (2013.01); *H04L 65/1006* (2013.01); *H04L 65/1009* (2013.01);
(Continued)

(58) Field of Classification Search
CPC .............. H04L 65/403; H04L 65/1006; H04L 65/1009; H04L 65/1083; H04M 3/567; H04N 7/152
See application file for complete search history.

(56) References Cited

U.S. PATENT DOCUMENTS 6,396,510 B1 * 5/2002 Pendse .................. H04N 7/148
348/E7.082
7,035,230 B1 * 4/2006 Shaffer ............... H04L 12/1818
370/261
(Continued)

FOREIGN PATENT DOCUMENTS

CN 102710922 A 10/2012
CN 105262975 A 1/2016

OTHER PUBLICATIONS

International search report of PCT Patent Application No. PCT/CN2018/086212 dated Jul. 31, 2018.

*Primary Examiner* — Blake J Rubin

(57) ABSTRACT

Disclosed are a video conference implementation method and server, and a computer readable storage medium. The method includes: a video conference server receiving from a terminal a virtual conference number of a conference to be convened; detecting whether the virtual conference number and a corresponding conference state are contained in a stored virtual conference draft; if the virtual conference number is contained and the state is "not convened", sending to a multipoint control unit conference parameters corresponding to the virtual conference number, and receiving a conference state returned by the multipoint control unit.

6 Claims, 3 Drawing Sheets

(52) U.S. Cl.
CPC ........ *H04L 65/1083* (2013.01); *H04M 3/567* (2013.01); *H04N 7/152* (2013.01)

(56) References Cited

U.S. PATENT DOCUMENTS

| | | | | |
|---|---|---|---|---|
| 7,174,365 | B1* | 2/2007 | Even | H04M 3/367 348/14.08 |
| 7,822,186 | B1* | 10/2010 | Boni | H04M 3/432 379/210.01 |
| 8,260,854 | B2* | 9/2012 | Cockerton | H04N 7/15 709/204 |
| 8,296,361 | B1* | 10/2012 | Shaffer | H04M 3/56 709/204 |
| 8,527,287 | B1* | 9/2013 | Bhatia | G06Q 10/109 705/1.1 |
| 2002/0165963 | A1* | 11/2002 | Baxley | H04L 47/801 709/226 |
| 2003/0014488 | A1* | 1/2003 | Dalal | H04L 65/4038 709/204 |
| 2003/0028656 | A1* | 2/2003 | Babka | H04L 47/6265 709/229 |
| 2003/0035381 | A1* | 2/2003 | Chen | H04M 7/0033 370/261 |
| 2003/0142635 | A1* | 7/2003 | Roher | H04M 3/567 370/260 |
| 2003/0169330 | A1* | 9/2003 | Ben-Shachar | H04N 7/152 348/14.09 |
| 2004/0032485 | A1* | 2/2004 | Stephens, Jr. | H04M 3/567 348/14.08 |
| 2004/0165710 | A1* | 8/2004 | DelHoyo | H04N 7/152 379/202.01 |
| 2005/0078171 | A1* | 4/2005 | Firestone | H04L 12/1822 348/14.08 |
| 2005/0108328 | A1* | 5/2005 | Berkeland | H04L 65/4046 709/204 |
| 2006/0146734 | A1* | 7/2006 | Wenger | H04L 29/06027 370/260 |
| 2006/0171337 | A1* | 8/2006 | Shaffer | H04L 12/1818 370/261 |
| 2006/0245419 | A1* | 11/2006 | Nag | H04L 65/608 370/352 |
| 2007/0126862 | A1* | 6/2007 | Even | H04M 3/567 348/14.08 |
| 2007/0133438 | A1* | 6/2007 | Shaffer | H04L 12/1813 370/260 |
| 2007/0223676 | A1* | 9/2007 | Sasaki | H04L 29/06027 379/202.01 |
| 2008/0069011 | A1* | 3/2008 | Sekaran | H04L 65/4038 370/260 |
| 2008/0239995 | A1* | 10/2008 | Lee | H04L 12/1818 370/260 |
| 2010/0228823 | A1* | 9/2010 | Galvin, Jr | H04L 67/14 709/204 |
| 2011/0058013 | A1* | 3/2011 | Khot | H04M 3/565 348/14.09 |
| 2011/0279631 | A1* | 11/2011 | Ranganath | H04N 7/142 348/14.08 |
| 2012/0005278 | A1* | 1/2012 | Muller | G06Q 10/1095 709/206 |
| 2012/0162355 | A1* | 6/2012 | Cheng | H04N 7/15 348/14.08 |
| 2012/0236106 | A1* | 9/2012 | Wu | H04N 7/152 348/14.07 |
| 2013/0093835 | A1* | 4/2013 | Paithankar | H04N 7/152 348/14.07 |
| 2013/0162758 | A1* | 6/2013 | Shin | H04L 65/403 348/14.09 |
| 2013/0321560 | A1* | 12/2013 | Angelo, Sr. | H04L 65/4046 348/14.03 |
| 2013/0339781 | A1* | 12/2013 | Wamorkar | G06F 11/0757 714/4.2 |
| 2014/0108084 | A1* | 4/2014 | Bargetzi | H04L 63/105 705/7.19 |
| 2014/0176667 | A1* | 6/2014 | Wang | H04N 7/152 348/14.09 |
| 2014/0368605 | A1* | 12/2014 | Liu | H04N 7/152 348/14.09 |
| 2015/0067047 | A1* | 3/2015 | Fu | H04L 67/16 709/204 |
| 2015/0092617 | A1* | 4/2015 | Liu | H04L 65/1069 370/260 |
| 2015/0097922 | A1* | 4/2015 | Le Devehat | H04L 65/403 348/14.08 |
| 2015/0215175 | A1* | 7/2015 | Wu | G06Q 10/06 709/226 |
| 2016/0004981 | A1* | 1/2016 | Wang | G06Q 10/1095 705/6 |
| 2016/0057391 | A1* | 2/2016 | Block | H04N 7/152 348/14.07 |
| 2016/0117645 | A1* | 4/2016 | Moran | G06Q 10/1095 705/7.19 |
| 2017/0150101 | A1* | 5/2017 | Liao | H04L 65/1083 |
| 2018/0234471 | A1* | 8/2018 | Qian | H04L 61/2514 |

* cited by examiner

VIDEO CONFERENCE IMPLEMENTATION METHOD, SERVER AND COMPUTER READABLE STORAGE MEDIUM

TECHNICAL FIELD OF THE INVENTION

The present disclosure relates to the technical field of multimedia communication, in particular to a video conference implementation method, a server and a computer readable storage medium.

BACKGROUND OF THE INVENTION

With the increasing scale of modern enterprises and the increasingly dispersed distribution of people, the demand for collaborative office work in different places is becoming more and more urgent. A conference system has become an important and effective communication tool for collaborative office work in different places because it can visually interact through real-time transmission of sound and image data. In existing conference systems, conferences are usually held in the following ways: determine conference participants and conference time, make conference appointments or configure conference drafts by conference managers, and finally hold conferences according to scheduled times. This way suffers from the following disadvantages that (1) conference participants are needed to be basically determined before the conference, temporarily adding conference participants cannot be carried out until the conference is started and conference information is known; (2) the conference holding time is basically fixed, and is not flexibly adjusted conveniently; and (3) it is complicated to perform some booking operations before the conference or to ask a conference administrator for assistance.

SUMMARY OF THE INVENTION

The following is a summary of the subject matter described in detail herein. This summary is not intended to limit the scope of the claims.

Provided is a video conference implementation method, a server and a computer readable storage medium, which can enable a user to simply and conveniently convene a video conference with dynamic changes of conference participants at any time and any place.

An embodiment of the disclosure provides a video conference implementation method, including the following steps of:

receiving, by a video conference server, a virtual conference number of a conference to be held from a terminal;

detecting, by the video conference server, whether a prestored virtual conference draft contains the virtual conference number, and a conference state corresponding to the virtual conference number;

if the virtual conference number is contained and the corresponding conference state is not held, sending, by the video conference server, a conference parameter corresponding to the virtual conference number to a multipoint control unit; receiving a conference state returned by the multipoint control unit, if the conference state is already held, storing the conference state and the multipoint control unit to a corresponding virtual conference number, and sending the multipoint control unit to the terminal;

and if the virtual conference number is contained and the corresponding conference state is already held, directly sending, by the video conference server, the multipoint control unit corresponding to the virtual conference number to the terminal.

In an exemplary embodiment, the sending, by the video conference server, the conference parameter corresponding to the virtual conference number to the multipoint control unit, specifically includes:

selecting the multipoint control unit suitable for the conference parameter according to the conference parameter corresponding to the virtual conference number, and sending the conference parameter corresponding to the virtual conference number to the multipoint control unit.

In an exemplary embodiment, the method further includes the steps of:

detecting, by the video conference server, whether all the conference participant terminals have already left the conference, and if all the conference participant terminals have already left the conference, setting the conference state corresponding to the virtual conference number as being not held and the corresponding multipoint control unit as a preset value.

In an exemplary embodiment, the communication protocols used between the video conference server and the terminal and between the video conference server and the multipoint control unit are H. 323 protocols or SIPs (Session Initiation protocols).

In an exemplary embodiment, after the step of receiving, by the video conference server, the virtual conference number of the conference to be held from the terminal, the method further includes the step of:

verifying, by the video conference server, user authority of the terminal, and if the verification is passed, detecting whether the prestored virtual conference draft contains the virtual conference number of the conference to be held and the conference state corresponding to the virtual conference number.

An embodiment of the disclosure further provides a computer readable storage medium having stored thereon a video conference implementation program which, when executed by a processor, implements the steps of the video conference implementation method of any of the described above.

An embodiment of the disclosure further provides a video conference server including a first interface unit, a processing unit, a second interface unit and a storage unit, wherein:

the first interface unit is configured to: receive a virtual conference number of a conference to be held from a terminal and notify the processing unit; and receive a notification of the processing unit, and send a multipoint control unit corresponding to the virtual conference number to a terminal;

the processing unit is configured to: receive a notification of the first interface unit, detect whether a virtual conference draft stored in the storage unit contains the virtual conference number and a conference state corresponding to the virtual conference number, notify the second interface unit if the virtual conference number is contained and the conference state corresponding to the virtual conference number is not held, and notify the first interface unit if the virtual conference number is contained and the conference state corresponding to the virtual conference number is already held; and receive a notification of the second interface unit, detect a conference state returned by the multipoint control unit, notify the first interface unit if the conference state is already held, and store the conference state and the multipoint control unit to a virtual conference number corresponding to the storage unit;

the second interface unit is configured to: receive the notification of the processing unit and send a conference parameter corresponding to the virtual conference number to the multipoint control unit; and receive a conference state returned by the multipoint control unit, and notify the processing unit;

and the storage unit is configured to: store the virtual conference draft which includes a plurality of virtual conference numbers and conference parameters, conference states and multipoint control units corresponding to the virtual conference numbers.

In an exemplary embodiment, if the virtual conference number is contained and the corresponding conference state is not held, the processing unit is further configured to select a multipoint control unit suitable for the conference parameter according to the conference parameter corresponding to the virtual conference number;

the sending, by the second interface unit, the conference parameter corresponding to the virtual conference number to the multipoint control unit specifically includes: sending the conference parameter corresponding to the virtual conference number to the selected multipoint control unit.

In an exemplary embodiment, the processing unit is further configured to: detect whether all the conference participant terminals have already left a conference, and if all the conference participant terminals have already left the conference, set the conference state corresponding to the virtual conference number in the storage unit as being not held and the corresponding multipoint control unit as a preset value.

In an exemplary embodiment, the communication protocols used between the video conference server and the terminal and between the video conference server and the multipoint control unit are H. 323 protocols or SIPs.

According to the video conference implementation method, the server and the computer readable storage medium provided by the disclosure, with the virtual conference number and the corresponding conference parameter which are prestored on the video conference server, the terminals can initiate or join a conference by calling the virtual conference number, and exit the conference by hanging up, so that the operation is simple and rapid without being limited by the time, places and conference participants, thereby meeting the communication requirements of users for a video conference that conference participants dynamically change at any time and any place; and the method is implemented by adopting a standard protocol, whether a special terminal in a traditional video conference room or a soft terminal installed on mobile equipment such as a mobile phone or the like can be accessed into the conference, and terminals with different brands can be compatible, thereby saving additional investment cost for the users.

Other aspects will be apparent upon reading and understanding the drawings and detailed description.

DETAILED DESCRIPTION OF THE EMBODIMENTS

Hereinafter, embodiments of the disclosure will be described in detail with reference to the accompanying drawings.

Figure 1:
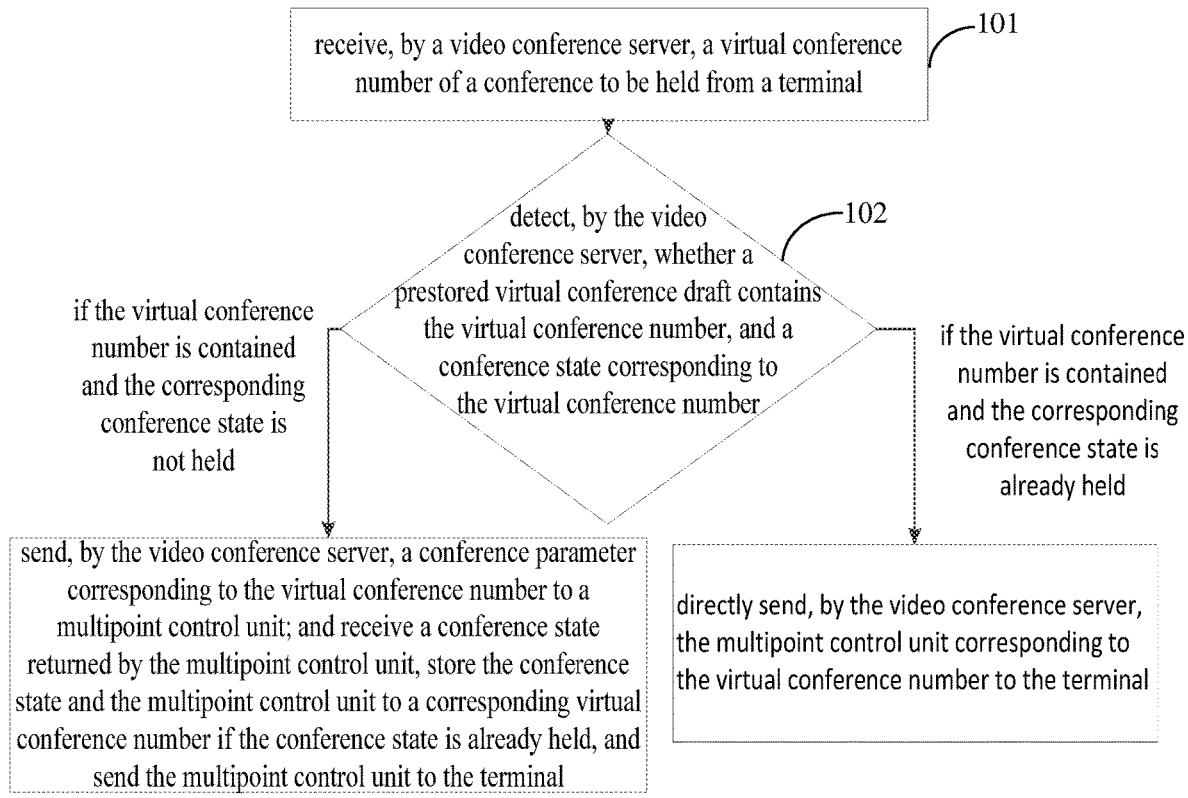
FIG. 1 is a flowchart of a video conference implementation method in accordance with an embodiment of the disclosure.

As shown in FIG. 1, the video conference implementation method according to the disclosure includes the following steps of:

at Step 101, receiving, by a video conference server, a virtual conference number of a conference to be held from a terminal;

wherein the video conference described in the disclosure includes a video session and an audio conference;

the step 101 specifically includes: receiving, by the video conference server, a conference holding request, in which the virtual conference number of the conference to be held is carried, from the terminal;

and at Step 102, detecting, by the video conference server, whether a prestored virtual conference draft contains the virtual conference number, and a conference state corresponding to the virtual conference number;

if the virtual conference number is contained and the corresponding conference state is not held, sending, by the video conference server, a conference parameter corresponding to the virtual conference number to a multipoint control unit; and receiving a conference state returned by the multipoint control unit, storing the conference state and the multipoint control unit to a corresponding virtual conference number if the conference state is already held, and sending the multipoint control unit to the terminal;

and if the virtual conference number is contained and the corresponding conference state is already held, directly sending, by the video conference server, the multipoint control unit corresponding to the virtual conference number to the terminal;

wherein the virtual conference draft is a template containing attributes of virtual conference numbers, conference parameters corresponding to the virtual conference numbers, conference states, used multipoint control units and the like;

and after the terminal receives the multipoint control unit corresponding to the virtual conference number, simply calling the multipoint control unit to hold or join the conference. The virtual conference number of the disclosure is different from a prefix of the conference number of the existing conference draft in that the virtual conference number is used for a terminal to initiate a conference holding request; and the conference number of the existing conference draft is used for initiating a conference request on a video conference server side. As long as conference participant terminals in the disclosure know the virtual conference number, a conference can be held or joined. The first terminal calling the virtual conference number will hold the conference, the terminals calling the virtual conference number later can directly join the conference, the conference can be exited when the terminals hang up, and when all the terminals hang up, the conference will be automatically closed. Then, to start the conference again, the terminals simply call the virtual conference number.

The sending, by the video conference server, the conference parameter corresponding to the virtual conference number to the multipoint control unit at the step 102 specifically includes:

selecting a multipoint control unit suitable for the conference parameter according to the conference parameter corresponding to the virtual conference number, and sending the conference parameter corresponding to the virtual conference number to the multipoint control unit.

In an embodiment of the disclosure, the conference parameters include parameters such as conference capabilities of the conference to be held, e.g., conference capacity, conference rates, video resolution, etc.

the detecting, by the video conference server, whether the prestored virtual conference draft contains the virtual conference number of the conference to be held, and the conference state corresponding to the virtual conference number in the step 102 specifically includes:

if the virtual conference number is contained and the corresponding conference state is not held, sending, by the video conference server, a conference initiating request, in which the conference parameter corresponding to the virtual conference number is carried, to the multipoint control unit; receiving a conference initiating response of the multipoint control unit, detecting a conference state in the conference initiating response, sending a conference holding response, in which the multipoint control unit used by the conference to be held is contained, to the terminal if the conference state is already held, and setting the conference state corresponding to the virtual conference number as being already held and the corresponding multipoint control unit; and if the virtual conference number is contained and the conference state of the virtual conference number is already held, directly sending, by the video conference server, the conference holding response to the terminal.

When at the step of receiving the conference state returned by the multipoint control unit in the step 102, the method further includes the following steps of:

if the conference state is not held, reselecting a multipoint control unit suitable for the conference parameter, and sending the conference parameter corresponding to the virtual conference number to the selected multipoint control unit.

After the step 102, the method further includes the steps of:

detecting, by the video conference server, whether all the conference participant terminals have already left the conference, and if all the conference participant terminals have already left the conference, setting the conference state corresponding to the virtual conference number as being not held and the corresponding multipoint control unit as a preset value.

In an embodiment of the disclosure, the preset value is a NULL value.

The communication protocols used between the video conference server and the terminal and between the video conference server and the multipoint control unit are H. 323 protocols or SIPs.

It is worth noting that the main standards of IP network communication in the world today are the H. 323 protocol and SIP, both of which provide a complete solution to IP telephony system signaling and use RTP (Real-Time Protocol) as the media transport protocol. The H. 323 protocol adopts a traditional telephone signaling mode, including a series of protocols; while SIP uses text-based protocols for reference to other Internet protocols. The H. 323 protocol is a VoIP service and video communication system for providing users over packet-switched networks instead of ordinary telephones, and the SIP is used to provide advanced telephony services across the Internet. Both protocols are widely used in video conference systems, and thus may be supported by the method and the system of the disclosure.

After the step 101, after the video conference server receives the virtual conference number of the conference to be held from the terminal, the method further includes the following steps of:

verifying, by the video conference server, user authority of the terminal, and if the verification is passed, proceeding to step 102.

For example, the video conference server may detect the user authority of the terminal through a prestored user name/password or an accessible terminal list.

The disclosure further discloses a computer readable storage medium having stored thereon a video conference implementation program which, when executed by a processor, implements the steps of the video conference implementation method of any of the described above.

Figure 2:
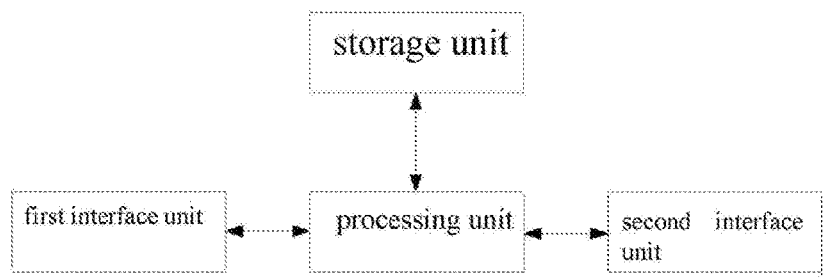
FIG. 2 is a schematic diagram of a video conference server in accordance with an embodiment of the disclosure.

As shown in FIG. 2, a video conference server in accordance with the disclosure includes a first interface unit, a processing unit, a second interface unit, and a storage unit, wherein, the first interface unit is configured to: receive a virtual conference number of a conference to be held from a terminal and notify the processing unit; and receive a notification of the processing unit, and send a multipoint control unit corresponding to the virtual conference number to a terminal;

the processing unit is configured to: receive a notification of the first interface unit, detect whether a virtual conference draft stored in the storage unit contains the virtual conference number and a conference state corresponding to the virtual conference number, notify the second interface unit if the virtual conference number is contained and the conference state corresponding to the virtual conference number is not held, and notify the first interface unit if the virtual conference number is contained and the conference state corresponding to the virtual conference number is already held; and receive a notification of the second interface unit, detect a conference state returned by the multipoint control unit, notify the first interface unit if the conference state is already held, and store the conference state and the multipoint control unit to a virtual conference number corresponding to the storage unit;

the second interface unit is configured to: receive the notification of the processing unit and send a conference parameter corresponding to the virtual conference number to the multipoint control unit; and receive a conference state returned by the multipoint control unit, and notify the processing unit;

and the storage unit is configured to: store the virtual conference draft which includes a plurality of virtual conference numbers and conference parameters, conference states and multipoint control units corresponding to the virtual conference numbers.

If the virtual conference number is contained and the corresponding conference state is not held, the processing unit is further configured to select a multipoint control unit suitable for the conference parameter according to the conference parameter corresponding to the virtual conference number;

and the sending, by the second interface unit, the conference parameter corresponding to the virtual conference number to the multipoint control unit specifically includes: sending the conference parameter corresponding to the virtual conference number to the selected multipoint control unit.

In an embodiment of the disclosure, the conference parameters include parameters such as conference capabilities of the conference to be held, e.g., conference capacity, conference rates, video resolution, etc.

When detecting the conference state returned by the multipoint control unit, the processing unit is further configured to reselect a multipoint control unit suitable for the conference parameter and notify the second interface unit if the conference state is not held.

The communication protocols used between the video conference server and the terminal and between the video conference server and the multipoint control unit are H. 323 protocols or SIPs.

The processing unit is further configured to: detect whether all the conference participant terminals have already left the conference, and if all the conference participant terminals have already left the conference, set the conference state corresponding to the virtual conference number in the storage unit as being not held and the corresponding multipoint control unit as a preset value.

Before detecting whether the virtual conference draft stored in the storage unit contains the virtual conference number and the conference state corresponding to the virtual conference number, the processing unit is further configured to: verify the user authority of the terminal, and if the verification is passed, detect whether the virtual conference draft stored in the storage unit contains the virtual conference number, and the conference state corresponding to the virtual conference number.

For example, the processing unit may verify the user authority of the terminal by means of a prestored user name/password or an accessible terminal list.

Figure 3:
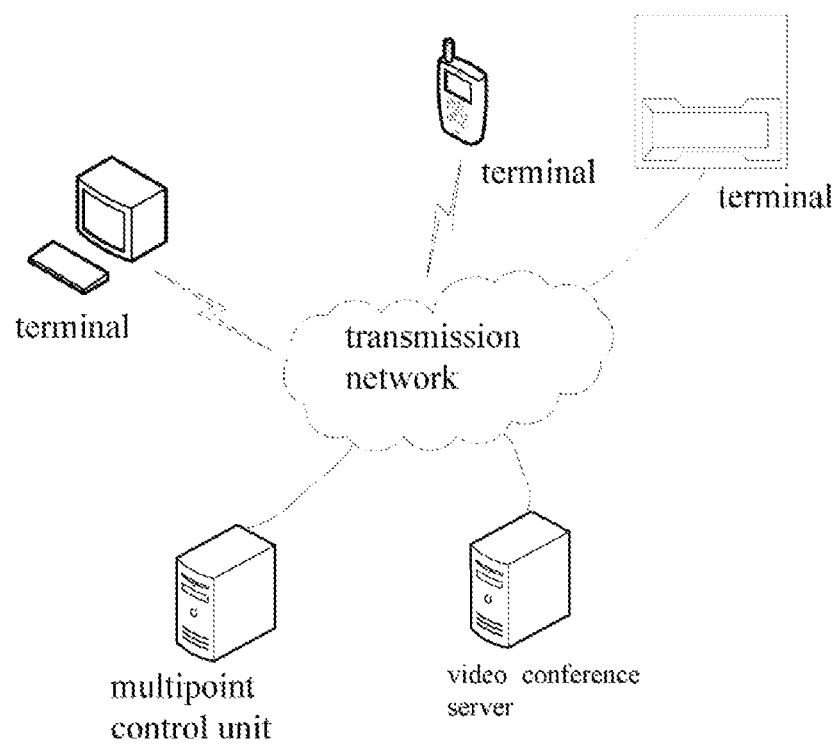
FIG. 3 is a schematic diagram of a connection structure of a video conference system of the disclosure.

As shown in FIG. 3, the video conference system in accordance with the disclosure includes a video conference server, a multipoint control unit, a transmission network, various types of terminals and the like, wherein:

the various types of terminals, which are devices for interaction between the video conference system and users, include a special hardware terminal in a conference room, a software terminal installed on a PC (personal computer), and a software terminal installed on mobile equipment such as a mobile phone; and in the method of the disclosure, when each type of terminal holds a conference, it is only necessary to know the virtual conference number;

The video conference server which is a management scheduling core of the video conference system receives a conference holding request message from the terminal, issues relevant parameters for starting a conference to the multipoint control unit after verification and judgment, receives a response message of the multipoint control unit, and replies the response message to the terminal, so that the terminal may complete conference joining operation;

The multipoint control unit is data exchange device for audio and video data in a video conference system, and after the conference is started, and may simultaneously receive multimedia information of a plurality of terminals and send the multimedia information to the remaining terminals after corresponding processing is completed according to conference parameters instructed by the video conference server;

and various parts of the video conference system carry out signaling and media interaction through the transmission network.

Figure 4:
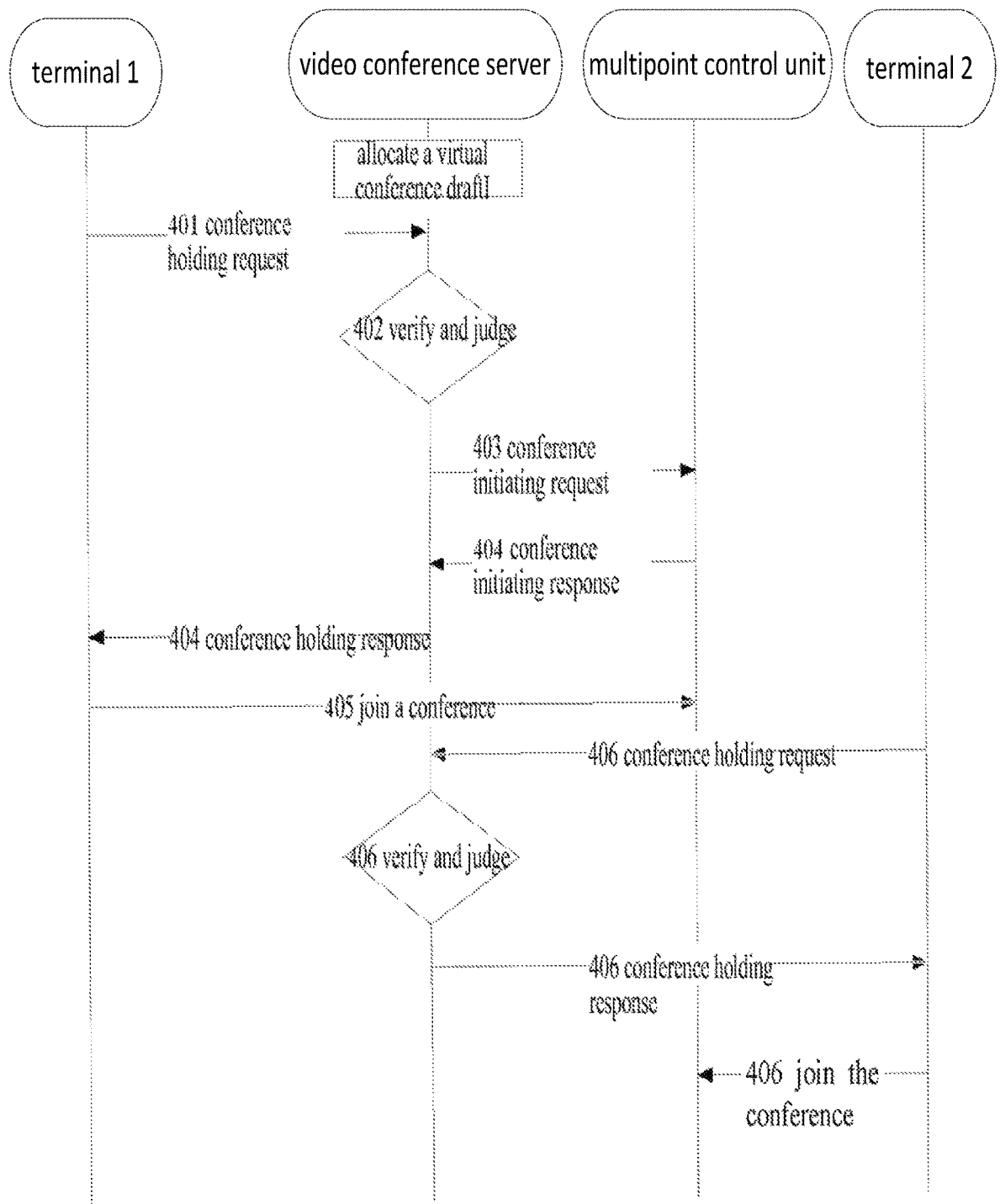
FIG. 4 is a business process schematic diagram of the video conference system of the disclosure.

FIG. 4 is a basic flowchart of conferencing of the video conference system of the disclosure, including the following steps:

at Step 401, a terminal 1 sends a conference holding request, in which a virtual conference number of a conference to be held is contained, to the video conference server;

at Step 402, the video conference server verifies and judges the conference holding request, and at the moment, if a virtual conference draft prestored by the video conference server contains the virtual conference number and a corresponding conference state is not held, the video conference server sends a conference initiating instruction with a conference parameter corresponding to the virtual conference number to the multipoint control unit; (if the virtual conference draft contains the virtual conference number and the corresponding conference state is already held, the video conference server directly sends a conference holding response to the terminal, and the terminal can directly join the conference; and if the virtual conference number does not exist in the virtual conference draft, the conference holding request from the terminal is rejected;)

at Step 403, the multipoint control unit receives a conference initiating instruction, allocates resources, initiates a conference and feeds a conference initiating response back to the video conference server;

at Step 404, the video conference server receives the conference initiating response of the multipoint control unit, and the conference is successfully held; then the conference holding response which contains the conference on a designated multi-point control unit is replied to the terminal 1;

at Step 405, after receiving the conference holding response, the terminal 1 then may call the designated multipoint control unit to join the conference; and at Step 406, the terminal 2 sends a conference holding request that carries a virtual conference number the same as that of the terminal 1 to the video conference server, the video conference server can directly reply to the conference holding response after verification and judgment, and then the terminal 2 can call a designated multipoint control unit to join the conference, so that both the terminal 1 and the terminal 2 join the conference.

In an embodiment of the disclosure, the conference holding request employs an Automatic Repeat Query (ARQ) message in an H. 323 protocol terminal, which carries a virtual conference number of a conference to be held; the conference holding response is an Admission Confirm (ACF) message that carrys a designated multipoint control unit, and after receiving the ACF message, the terminal 1 and the terminal 2 send a Setup message to the multipoint control unit, and then complete the conference joining operation according to the flow of the H. 323 protocol. If the conference holding request held by the terminal 1 or the terminal 2 is rejected, returned conference holding response information is an Access Reject (ARJ) message.

In another embodiment of the disclosure, the conference holding request employs an INVITE message in the SIP terminal, which carries a virtual conference number of a conference to be held; after receiving the request, the video conference server replies with a 100 Trying message, sends relevant parameters corresponding to the virtual conference number in the virtual conference draft to the multipoint control unit after verification and judgment, receives a conference initiating response of the multipoint control unit after starting the conference, and then replies with a response message of 180 Ring and 200 OK of the terminal 1 or the terminal 2, and the terminal 1 or the terminal 2 replies with an ACK message; and then the conference joining operation is completed according to the flow of the SIP.

According to the video conference implementation method, the server and the computer readable storage medium provided by the disclosure, the virtual conference number and the corresponding conference parameter are prestored on the video conference server, the terminals can initiate or join a conference by calling the virtual conference number, and exit the conference by hanging up, so that the operation is simple and rapid without being limited by the time, places and conference participants, thereby meeting the communication requirements of users for a video conference that conference participants dynamically change at any time and any place;

and the method is implemented by adopting a standard protocol, whether a special terminal in a traditional video conference room or a soft terminal installed on mobile equipment such as a mobile phone or the like can be accessed into the conference, and terminals with different brands can be compatible, thereby saving additional investment cost for the users.

It will be appreciated by those of ordinary skill in the art that all or some of the steps, systems, and functional modules/elements in the methods disclosed above may be implemented as software, firmware, hardware, and suitable combinations thereof. In a hardware implementation, the partitioning between functional modules/units mentioned in the above description does not necessarily correspond to the partitioning of physical components; for example, one physical component may have multiple functions, or one function or step may be executed by several physical components in cooperation. Some or all of the components may be implemented as software executed by a processor, such as a digital signal processor or microprocessor, or implemented as hardware, or as an integrated circuit, such as an application specific integrated circuit. Such software may be distributed over computer readable media, which may include computer storage media (or non-transitory media) and communication media (or transitory media). As is well known to those of ordinary skill in the art, the term computer storage media includes volatile and nonvolatile, removable and non-removable media implemented in any method or technology for storage of information, such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tapes, magnetic disk storages or other magnetic storage devices, or any other medium which can be used to store desired information and which can accessed by a computer. In addition, as is well known to those of ordinary skill in the art, communication media typically includes computer readable instructions, data structures, program modules, or other data in a modulated data signal such as a carrier wave or other transmission mechanism, and may include any information delivery media.

The foregoing is merely illustrative of the embodiments of the disclosure and is not intended to limit the disclosure, and various modifications and variations thereof will occur to those skilled in the art. Any modifications, equivalents, improvements, etc. that come within the spirit and principles of this disclosure are intended to be included within the scope of the disclosure.

INDUSTRIAL APPLICABILITY

According to the video conference implementation method, the server and the computer readable storage medium provided by the disclosure, with the virtual conference number and the corresponding conference parameter which are prestored on the video conference server, the terminals can initiate or join a conference by calling the virtual conference number, and exit the conference by hanging up, so that the operation is simple and rapid without being limited by the time, places and conference participants, thereby meeting the communication requirements of users for a video conference that conference participants dynamically change at any time and any place; and the method is implemented by adopting a standard protocol, whether a special terminal in a traditional video conference room or a soft terminal installed on mobile equipment such as a mobile phone or the like can be accessed into the conference, and terminals with different brands can be compatible, thereby saving additional investment cost for the users.

The invention claimed is:

1. A video conference implementation method, comprising the following steps of:

receiving, by a video conference server, a virtual conference number of a conference to be held from a terminal, wherein the virtual conference number is used for the terminal to initiate a conference holding request;

detecting, by the video conference server, whether a prestored virtual conference draft contains the virtual conference number and a conference state corresponding to the virtual conference number, if the virtual conference number does not exist in the virtual conference draft, the conference holding request from the terminal is rejected;

if the prestored virtual conference draft contains the virtual conference number and the corresponding conference state is not held, sending, by the video conference server, a conference parameter corresponding to the virtual conference number to a multipoint control unit; receiving a conference state returned by the multipoint control unit, if the conference state is already held, storing the conference state and the multipoint control unit to a corresponding virtual conference number, and sending information of the multipoint control unit to the terminal; and if the prestored virtual conference draft contains the virtual conference number and the corresponding conference state is held, directly sending, by the video conference server, information of the multipoint control unit corresponding to the virtual conference number to the terminal, so that the terminal establishes a correspondence relationship with the allocated corresponding multipoint control unit according to the received information of the multipoint control unit;

wherein the sending, by the video conference server, the conference parameter corresponding to the virtual conference number to the multipoint control unit comprises:

selecting the multipoint control unit suitable for the conference parameter according to the conference parameter corresponding to the virtual conference number, and sending the conference parameter corresponding to the virtual conference number to the multipoint control unit.

2. The video conference implementation method of claim 1, wherein the method further comprises the steps of:

detecting, by the video conference server, whether all the conference participant terminals have left the conference, and if all the conference participant terminals have already left the conference, setting the conference state corresponding to the virtual conference number as being not held and the multipoint control unit corresponding to the virtual conference number as a preset value.

3. The video conference implementation method of claim 1, wherein communication protocols used between the video conference server and the terminal and between the video conference server and the multipoint control unit are H.323 protocols or SIPs.

4. The video conference implementation method of claim 1, wherein after the step of the receiving, by video conference server, the virtual conference number of the conference to be held from the terminal, the method further comprises the steps of:

verifying, by the video conference server, user authority of the terminal, and if the verification is passed, detecting whether the prestored virtual conference draft contains the virtual conference number of the conference to be held and the conference state corresponding to the virtual conference number.

5. A non-transitory computer readable storage medium having stored thereon a video conference implementation program which, when executed by a processor, implements the steps of the video conference implementation method of claim 1.

6. A video conference server, comprising a processing unit and a storage unit, wherein the storage unit stored thereon a video conference implementation program which, when executed by the processing unit implements the steps of the video conference implementation method of claim 1.

* * * * *